(12) United States Patent
Hsu

(10) Patent No.: US 7,248,897 B2
(45) Date of Patent: Jul. 24, 2007

(54) METHOD OF OPTIMIZING RADIATION PATTERN OF SMART ANTENNA

(76) Inventor: Chao-Hsing Hsu, No. 16, Lane 29, Sec. 5, Dau-Yuan Road, Tung-Ho Li, Ern-Lin Chen, Chang-Hua Hsien (TW)

( * ) Notice: Subject to any disclaimer, the term of this patent is extended or adjusted under 35 U.S.C. 154(b) by 1045 days.

(21) Appl. No.: 10/292,300

(22) Filed: Nov. 12, 2002

(65) Prior Publication Data
US 2004/0090938 A1    May 13, 2004

(51) Int. Cl.
 *H04B 1/38* (2006.01)
 *H01Q 3/00* (2006.01)
(52) U.S. Cl. .................... 455/561; 455/562.1; 342/377
(58) Field of Classification Search ................ 455/561, 455/562.1, 273, 272, 63.1, 67.11, 114.2; 370/330, 370/335; 342/377, 372
See application file for complete search history.

(56) References Cited

U.S. PATENT DOCUMENTS

| | | | | |
|---|---|---|---|---|
| 5,818,385 | A * | 10/1998 | Bartholomew | 342/372 |
| 6,128,276 | A * | 10/2000 | Agee | 370/208 |
| 6,801,160 | B2 * | 10/2004 | Henderson et al. | 342/373 |
| 7,092,690 | B2 * | 8/2006 | Zancewicz | 455/273 |

OTHER PUBLICATIONS

Barry D. Van Veen and Kevin M. Buckley, Beamforming: A Versatile Approach to Spatial Filtering, IEEE ASSP Magazine, Apr. 1988, Whole Document.*
Lal C. Godara, Application of Antenna Arrays to Mobile Communications, Part II: Beam-Forming and Direction-of-Arrival Considerations, Proceedings of the IEEE, vol. 85, No. 8, Aug. 1997, Whole Document.*

* cited by examiner

*Primary Examiner*—Charles N. Appiah
*Assistant Examiner*—Bryan Fox
(74) *Attorney, Agent, or Firm*—Seyfarth Shaw LLP

(57) ABSTRACT

In this invention, the formulas of optimizing radiation pattern of the smart antenna have been deduced and a set of weights, including amplitude and phase shift weight or only phase shift weights, for optimal channel assignment is generated using optimization techniques (e.g., advance algorithms) for smart antennas. These algorithms can deal with the Spatial Division Multiple Access (SDMA) to enlarge the capacity of communication systems and maximize the main lobes toward the users as well as minimize the pattern nulling toward the interfering sources by iterating both the amplitude weights and phase shift weights or the phase shift weight only of a cost function. Thus, an optimal radiation pattern could be derived based on the output power of the cost function with iterated amplitude and phase shift weights or only phase shift weights. At the same time, SDMA of smart antennas can be come true.

14 Claims, 12 Drawing Sheets

METHOD OF OPTIMIZING RADIATION PATTERN OF SMART ANTENNA

BACKGROUND OF THE INVENTION (A) Field of the Invention

The present invention is related to a method of an optimizing radiation pattern of a smart antenna. Specifically, it can come true SDMA (Space Division Multiple Access) of smart antennas.

(B) Description of Related Art

In tradition, wireless communication at the same base station has been separated by frequency such as FDMA (Frequency Division Multiple Access); by time such as TDMA (Time Division Multiple Access); or by code such as CDMA (Code Division Multiple Access). Smart antennas add a new method of separating users by space through SDMA.

Usually, base station antennas using an omnidirectional or sectored radiation pattern cause power waste in unexpected direction and interference for the other users. A smart antenna system, a perfect idea to solve the problem, can suppress interferences by placing nulls in the antenna pattern in the directions of the interfering sources for co-channeling and adjusting the directions of main lobes toward the users.

Facing the advanced demand for wireless mobile communications, the use of smart antenna exploits spatial diversity to further improve spectral efficiency. Basically, a smart antenna is an array antenna combined via a beamforming network (amplitude and phase control network). The beamforming network can be implemented in either RF-circuitry, real-time digital signal processing hardware, or in a hybrid solution.

The benefits of smart antennas include lower power consumption, intersymbol interference reduction, signal and interference ratio increment, range extension, higher data rate support, and ease of integration into the base station system. The capacity of a system is limited by co-channel interference. Smart antennas can offer the spatial allocation of multiple mobile users to a co-channel using the technique of Spatial Division Multiple Access (SDMA) with its spatial separation ability, thereby increasing the system capacity.

More specifically, the benefits derived from a smart antenna system are described as follows: (a) interference rejection: smart antennas can suppress the interferences generated by other user signals of the co-channel via the pattern nulling technique; (b) multipath rejection: smart antennas can place nulls on multipath and put main lobes toward the users to solve the multipath problem; (c) better coverage: focusing the energy sent into the cell increases the base station coverage. Lower power requirement also makes a battery life longer for a handset; (d) increasing capacity: the spatial allocation at a co-channel is an efficient method to increase the capacity of cellular radio networks by smart antenna systems; (e) reducing expense: owing to better coverage, less base station request, lower amplifier costs and lower power consumption will result; and (f) increasing signal power gain: the signal power gain will be increased because input signals from antenna elements are combined to optimize available power.

To sum up, smart antenna technology can effectively improve wireless system performance. It can work in operators of personal communication system (PCS), cellular and wireless local loop (WLL) networks. Moreover, the smart antenna system is also applicable to all major wireless protocols and standards.

SUMMARY OF THE INVENTION

There has been considerable interest in using antenna linear arrays in wireless communication networks to increase the capacity and decrease the co-channel interference as well as enhance desired signals. Adaptive radiation pattern with smart antennas at the receiver and transmitter increases signal-to-interference ratio (SIR) and the capacity in a wireless link.

The present invention reveals an optimization technique (advance algorithm) with adaptive cost function to obtain the optimal design. The features of the technique are in performing of phase-amplitude or phase-only perturbations, i.e., a search procedure based on the advanced algorithm to obtain an iterative solution for the designed optimal patterns. A set of weights for optimal channel assignment is generated using the optimization technique for smart antennas. This algorithm can deal with the SDMA to exploit the spatial diversity among the users and enlarge the capacity of communication systems. Furthermore, this algorithm can avoid co-channel interferences and maximize the main lobes.

Specifically, the method for optimizing radiation pattern of a smart antenna, which includes a linear array of antenna elements, of the present invention comprises the steps: (1) the directions of desired signals and interfering signals are determined; (2) the amplitude weights and phase shift weights of the antenna elements in a cost function are iterated until the cost function in the direction of the desired signal is maximized and the cost function in the direction of the interfering signals is minimized; and (3) the radiation power of the smart antenna at various angles are obtained by the cost function with iterated amplitude weights and phase shift weights, thereby generating an optimized radiation pattern of the smart antenna.

If the reference point is set at the physical center of the linear array, amplitude weights are in even symmetry and phase shift weights are in odd symmetry. The cost function, namely array factor, $AF_m(\theta)$ of the adaptive linear array for receiver m of the present invention can be deduced as:

$$AF_m(\theta) = 2*\frac{1}{M}\sum_{n=1}^{N}\alpha_{mn}\cos[(n-0.5)\psi + \beta_{mn}], m = 1, 2, 3, \ldots, M$$

It is suitable to perform the iteration and to search the optimal solutions.

Moreover, an alternative of constant amplitude weights can be implemented in the form of phase-only perturbation, i.e. $\alpha_{mn} = \alpha$, and $\alpha$ is constant).

DETAILED DESCRIPTION OF THE INVENTION

An adaptive antenna is a subset of a smart antenna, i.e., a smart antenna is composed of several adaptive antennas. Smart antenna technology is an adaptive signal processing technology that efficiently cancels signal interferences, maximizes main lobes toward users and increases capacity using a linear array antenna.

Figure 1A:
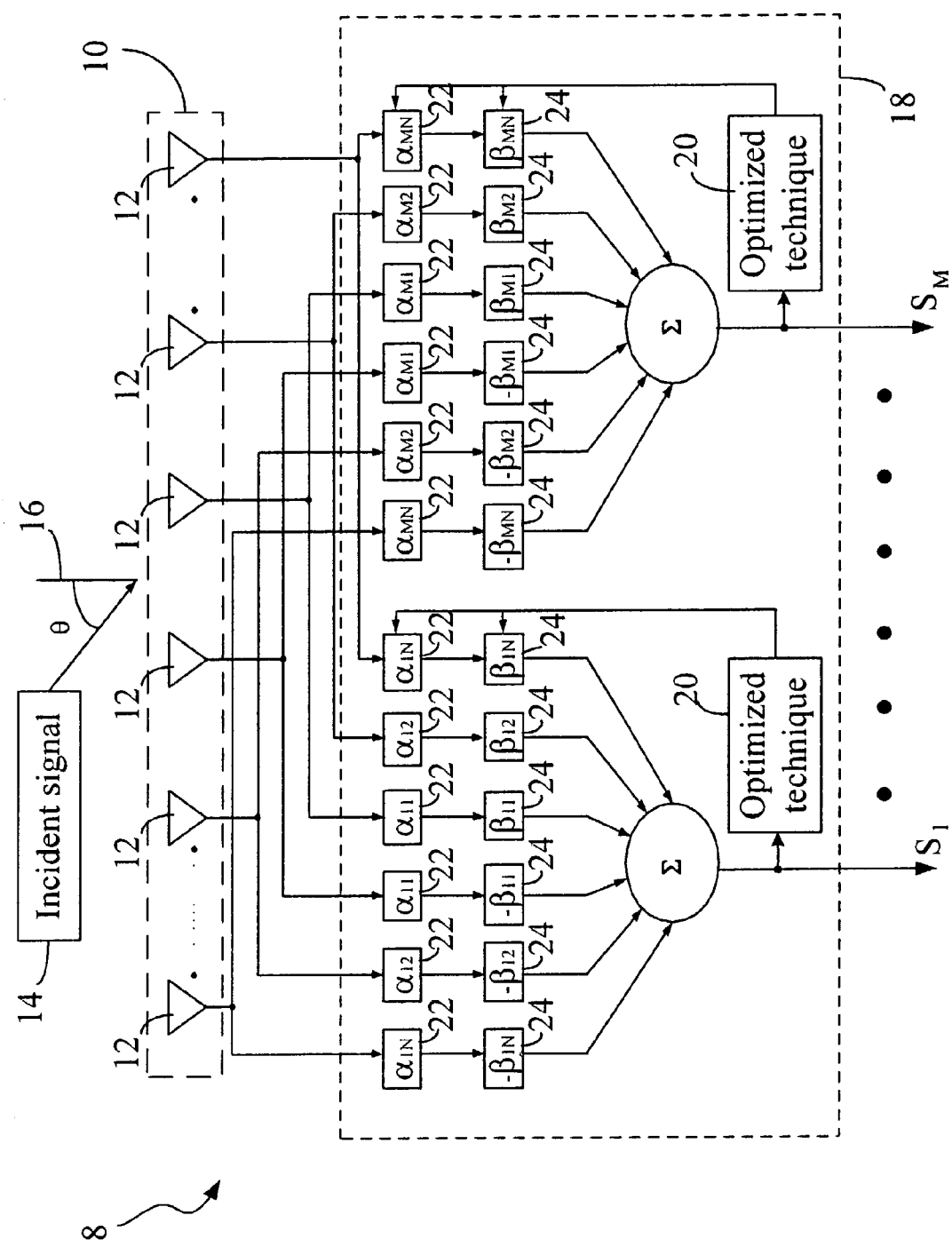
FIG. 1(a) is an uplink diagram of smart antenna in accordance with the present invention.

FIG. 1(a) illustrates an uplink diagram of smart antenna for receiver in accordance with the present invention. A smart antenna 8 includes a linear array 10 of 2N antenna elements 12 for receiver. The angle between an incident signal 14 and the array normal 16 is θ. The incident signal 14 could be from a desired source or an interfering source. In case of M users in a same channel of the smart antenna 8, a radiation cluster network 18 employs a optimization technique 20, amplitude weights 22 and phase shift weights 24 are iterated to obtain optimal amplitude weights and phase shift weights as well as an optimal radiation pattern of the smart antenna 8 for receiver, i.e., the SIR of the desired signal is maximized. The optimized signals $S_1$ to $S_M$ of user 1 to user M from the radiation cluster 18 are output respectively.

Figure 1B:
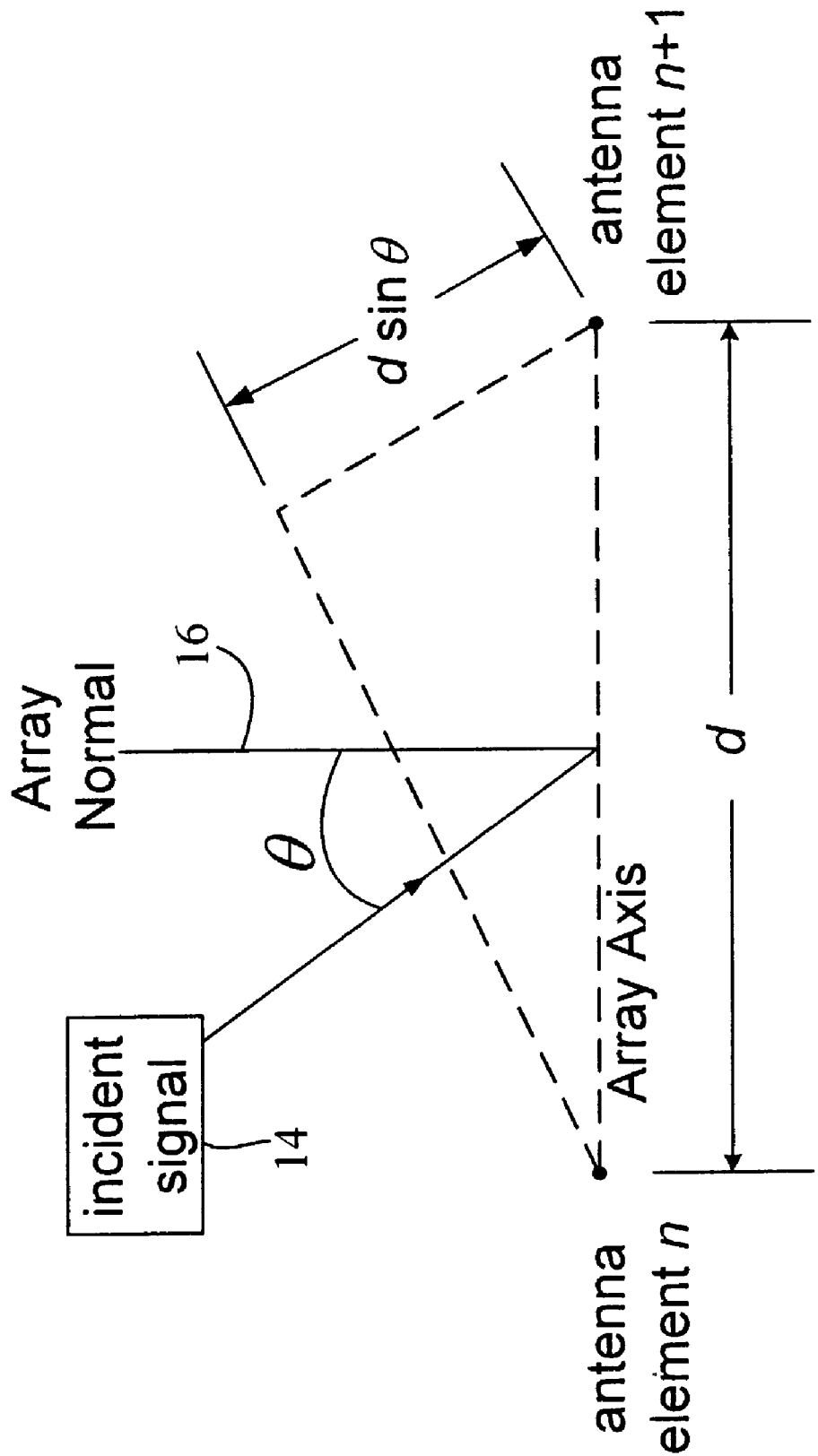
FIG. 1(b) illustrates an incident mechanism of smart antenna in accordance with the present invention.

For the linear array 10 of equispaced antenna elements 12 as shown in FIG. 1(a), in which the incident signal 14 of wavelength λ from direction θ with respect to the array normal 16 impinges on any two adjacent antenna element n and antenna element n+1 by the distance d as shown in FIG. 1(b). Theoretically, the incident signal 14 will reach antenna element n first then antenna element n+1; the time difference τ can be expressed as follows:

$$\tau = \frac{d\sin\theta}{v} \quad (1)$$

where v is the propagation speed of the radio wave of the incident signal 14, τ corresponds to a phase shift ψ:

$$\psi = \frac{2\pi}{\lambda}d\sin\theta = kd\sin\theta \quad (2)$$

Then, for far field, the array factor, i.e. cost function, of the adaptive linear array 10 for receiver m of a smart antenna can be written as $$AF_m(\theta) = \frac{1}{M}\sum_{n=1}^{2N} w_{mn}e^{j(n-1)\psi}, m = 1, 2, 3, \ldots, M \quad (3)$$

Wherein M is the number of users, 2N is the number of antenna elements 12, $w_{mn}$ is the complex array weight at antenna element n of receiver m and can be expressed as:

$$w_{mn} = \alpha_{mn}e^{j\beta_{mn}} \quad (4)$$

where
$\alpha_{mn}$: amplitude weight at antenna element n for receiver m
$\beta_{mn}$: phase shift weight at antenna element n for receiver m If the reference point is set at the physical center of the linear array 10, the array factor can be rewritten as:

$$AF_m(\theta) = \frac{1}{M}\sum_{n=1}^{2N} w_{mn}e^{j(n-N-0.5)\psi} = \frac{1}{M}\sum_{n=1}^{2N} \alpha_{mn}e^{j[(n-N-0.5)\psi+\beta_{mn}]}, \quad (5)$$

$$m = 1, 2, 3, \ldots, M$$

Furthermore, because of using phase-amplitude perturbation, amplitude weights are in even symmetry and phase shift weights are in odd symmetry, equation (5) can be simplified to $$AF_m(\theta) = 2*\frac{1}{M}\sum_{n=1}^{N} \alpha_{mn}\cos[(n-0.5)\psi+\beta_{mn}], \quad (6)$$

$$m = 1, 2, 3, \ldots, M$$

As only the real part is left, it is suitable to search the optimal solutions.

The value of $\alpha_{mn}$ is set between 0.1 and 1. The value of $\beta_{mn}$ is set between −π and π.

A genetic algorithm, a kind of optimization technique, adjusts the phase shift and amplitude weights based on the power of the array in the interfering directions and in the desired signal direction. The goals are to minimize the total output power of the interfering signals and maximize the total output power of the desired signal to the receiver. These techniques will maximize the SIR and comprise the steps as follows: (1) initialization: a set of chromosome (population) is randomly generated. For receiver m, the initial step is randomly generating a collection of weight vector ($\alpha_{p1}$, $\alpha_{p2}$, ..., $\alpha_{pN}$, $\beta_{p1}$, $\beta_{p2}$, ..., $\beta_{pN}$), p=1, 2, 3, ..., P. P is the number of chromosomes or a population size. 2N is the number of weight elements. A vector and a variable are defined, to which the gradually optimized chromosome and its fitness value are saved respectively. Their initial values are the first chromosomes of the generated chromosome set and its fitness value; (2) evaluation: to evaluate the fitness of each chromosome (a set of weights). For every chromosome, the objective function is calculated in order to evaluate its fitness value. Every chromosome's fitness value is checked and compared with the present best fitness value one by one. If one chromosome can give the output power of the desired signal to be increased and the biggest output power of the interfering signals is lower than that of the previous generation, the defined vector and variable are renewed with this chromosome and its fitness value. Otherwise, the values are unchanged; (3) selection: the survivors of the current population are decided according to the survival rate $p_s$. A random number generator is used to generate a random number for each chromosome. Their values are between 0 and 1. If the value of the random number is smaller than $p_s$, the corresponding chromosome survives; otherwise, it does not. The chromosome possessing the best fitness of the population always survives; (4) crossover: pairs of parents are randomly selected from those survivors. Then, to undergo a subsequent crossover operation gives birth to the child chromosomes, which will form the new population of the next generation. The number of new population equals to the number of those discarded in the last step, i.e., the summation of crossover rate and survivor rate equals to 1. Single point crossover method is used to generate the next generation. The weight string from the beginning of chromosome to the crossover point is copied from one parent; the rest is copied from the other parent; (5) mutation: some useful genes may not be generated in the initial step. This problem can be overcome by using the mutation technique. The basic mutation operator randomly generates a number as the mutation position and then changes the value of the gene at this position randomly; (6) termination: above steps (2)-(5) are repeated till the predefined number of generations has been reached. The most appropriate weight vector (phase shift weights and amplitude weights) can be obtained after termination.

Moreover, a new method named reference convergence is implemented in the present invention for determining which chromosome should be kept for the next step iteration. It should make the output power of desired signal increase and the biggest output power of all the interfering signals decrease monotonically. Below are detailed explanations on this method for a system of one desired signal and two interfering signals.

Assuming the best chromosome and its fitness for the interfering signals are saved in vector C and variable F, the chromosome and its fitness selected out from the nth iteration step are $C_n$ and $F_n$. Those selected out from the (n+1)th iteration step are $C_{n+1}$ and $F_{n+1}$. $F^1$ denotes the first interfering signal, and $F^2$ denotes the second interfering signal.

Case 1: If both $F_{n+1}^1$ and $F_{n+1}^2$ are larger than F, the value of C and F are unchanged.

Case 2: If both $F_{n+1}^1$ and $F_{n+1}^2$ are smaller than F; and $F_{n+1}^1$ is smaller than $F_n^1$ and $F_{n+1}^2$ is smaller than $F_n^2$; then, F is replaced with the larger one of $F_{n+1}^1$ and $F_{n+1}^2$;

the value of C is changed to the corresponding $C_{n+1}$.

Case 3: If both $F_{n+1}^1$ and $F_{n+1}^2$, are smaller than F; and $F_{n+1}^1$ is smaller than $F_n^1$, but $F_{n+1}^2$ is larger than $F_n^2$ (or $F_{n+1}^2$ is smaller than $F_n^2$ but $F_{n+1}^1$ is larger than $F_n^1$); then, F is replaced with the larger one of $F_{n+1}^1$ and $F_{n+1}^2$;

the value of C is changed to the corresponding $C_{n+1}$.

The reference convergence method offers more chances to change curve of simulation so that SIR can be increased quickly in a few steps of iterations. So, the reference convergence method is more effective than the regular convergence method for the real time signal processing.

The followings are embodiments employing the techniques of optimizing radiation pattern mentioned above, which shows excellent SIR result and achieve SDMA of smart antennas at the same time.

Figure 2A:
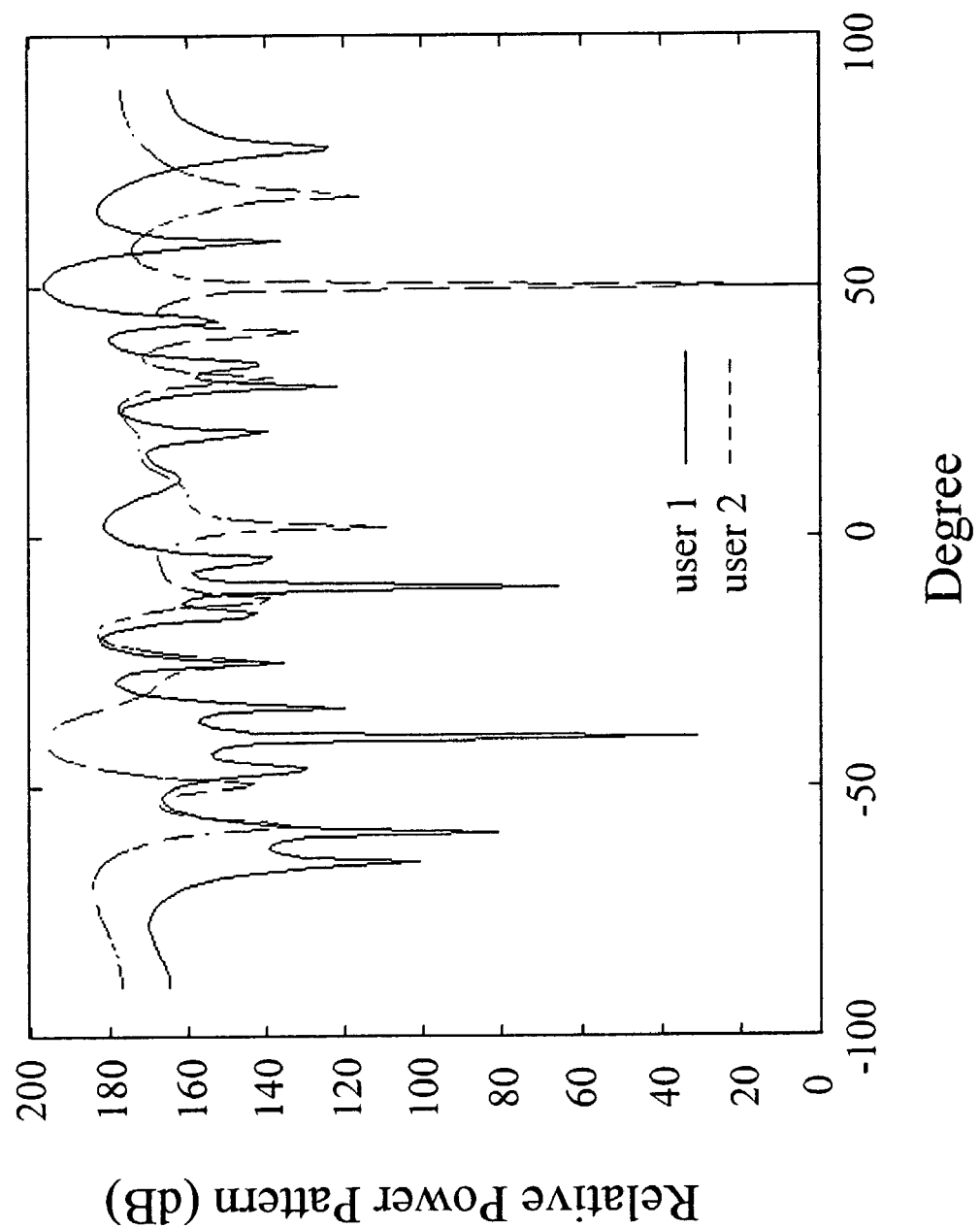
FIG. 2(a) and FIG. 2(b) illustrate an uplink optimized radiation patterns by phase-amplitude perturbation in accordance with the present invention.
Figure 2B:
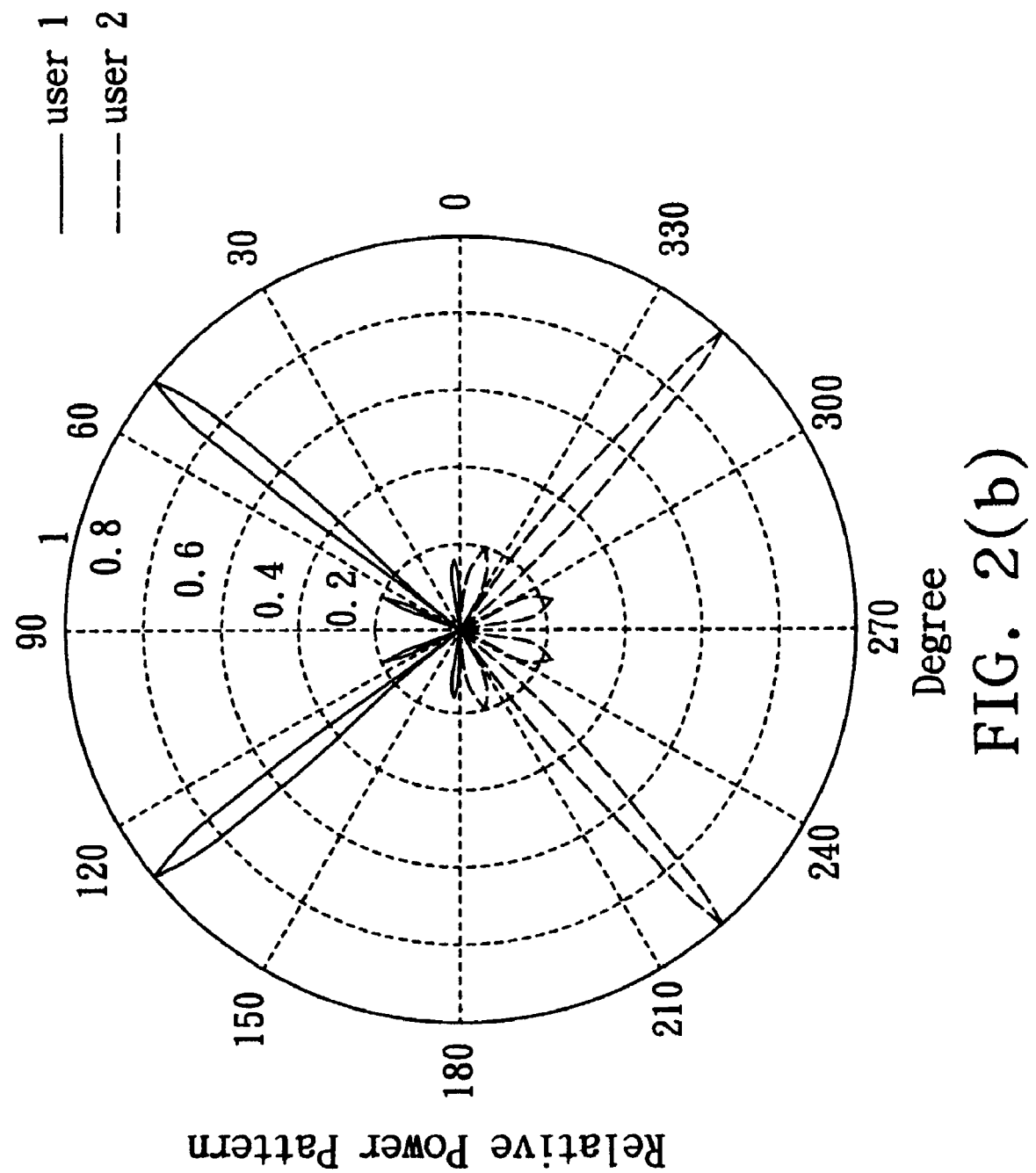

In case of 20 isotropic antenna elements 12 and 2 users, i.e. N=10, M=2, the signals of user 1 and user 2 come from 50° and −40° respectively. As to the radiation pattern of user 1, the signal of user 2 is considered as an interfering signal of user 1. The weight vector [$\alpha_{mn}$; $\beta_{mn}$], m=1, n=1, 2, 3, . . . , N, for the optimal radiation pattern of user 1 after 300000 genetic algorithm iterations, is derived as listed in Table 1. The simulation of the optimal radiation pattern is shown as the solid line in FIG. 2(a). In the radiation pattern of user 1, the null is derived in interfering direction at −40° and the maximum main lobe is derived at 50°. The SIR is 165 dB. So, the interference on user 1 due to user 2 can be ignored. Thus, the optimal radiation pattern in 360° of user 1 has been derived as showed as solid line in FIG. 2(b).

As to the radiation pattern of user 2, the signal of user 1 is considered as an interfering signal to user 2. The weight vector [$\alpha_{mn}$; $\beta_{mn}$], m=2, n=1, 2, 3, . . . , N, for the optimal radiation pattern of user 2 after 300000 genetic algorithm iterations, is derived as listed in Table 1. The simulation of the optimal radiation pattern is shown as the dashed line in FIG. 2(a). In the radiation pattern of user 2, the nulling is derived in the interfering direction at 50° and the maximum main lobe is derived at −40°. The SIR is 198 dB. So, the interference on user 2 due to user 1 can be ignored. Thus, the optimal radiation pattern in 360° of user 2 has been derived and shown as the dashed line in FIG. 2(b).

TABLE 1

The weight vector [$\alpha_{mn}$; $\beta_{mn}$] for the optimal radiation pattern of two users

| Radiation pattern of user 1: desired signal direction at 50° and interfering source at −40° | Radiation pattern of user 2: desired signal direction at −40° and interfering source at 50° |
|---|---|
| $\alpha_{11} = 0.540$, $\beta_{11} = -0.741$ | $\alpha_{21} = 0.992$, $\beta_{21} = 1.532$ |
| $\alpha_{12} = 0.185$, $\beta_{12} = 0.113$ | $\alpha_{22} = 0.853$, $\beta_{22} = 2.983$ |
| $\alpha_{13} = 0.825$, $\beta_{13} = -0.521$ | $\alpha_{23} = 0.982$, $\beta_{23} = -0.333$ |
| $\alpha_{14} = 0.752$, $\beta_{14} = -1.375$ | $\alpha_{24} = 0.883$, $\beta_{24} = 0.251$ |
| $\alpha_{15} = 0.633$, $\beta_{15} = 1.733$ | $\alpha_{25} = 0.763$, $\beta_{25} = 1.790$ |
| $\alpha_{16} = 0.407$, $\beta_{16} = -0.779$ | $\alpha_{26} = 0.723$, $\beta_{26} = -2.594$ |
| $\alpha_{17} = 0.725$, $\beta_{17} = -2.889$ | $\alpha_{27} = 0.790$, $\beta_{27} = 0.948$ |
| $\alpha_{18} = 0.879$, $\beta_{18} = -0.057$ | $\alpha_{28} = 0.517$, $\beta_{28} = -2.430$ |
| $\alpha_{19} = 0.928$, $\beta_{19} = -1.287$ | $\alpha_{29} = 0.324$, $\beta_{29} = -1.426$ |
| $\alpha_{110} = 0.710$, $\beta_{110} = 1.827$ | $\alpha_{210} = 0.433$, $\beta_{210} = 0.980$ |

Figure 3A:
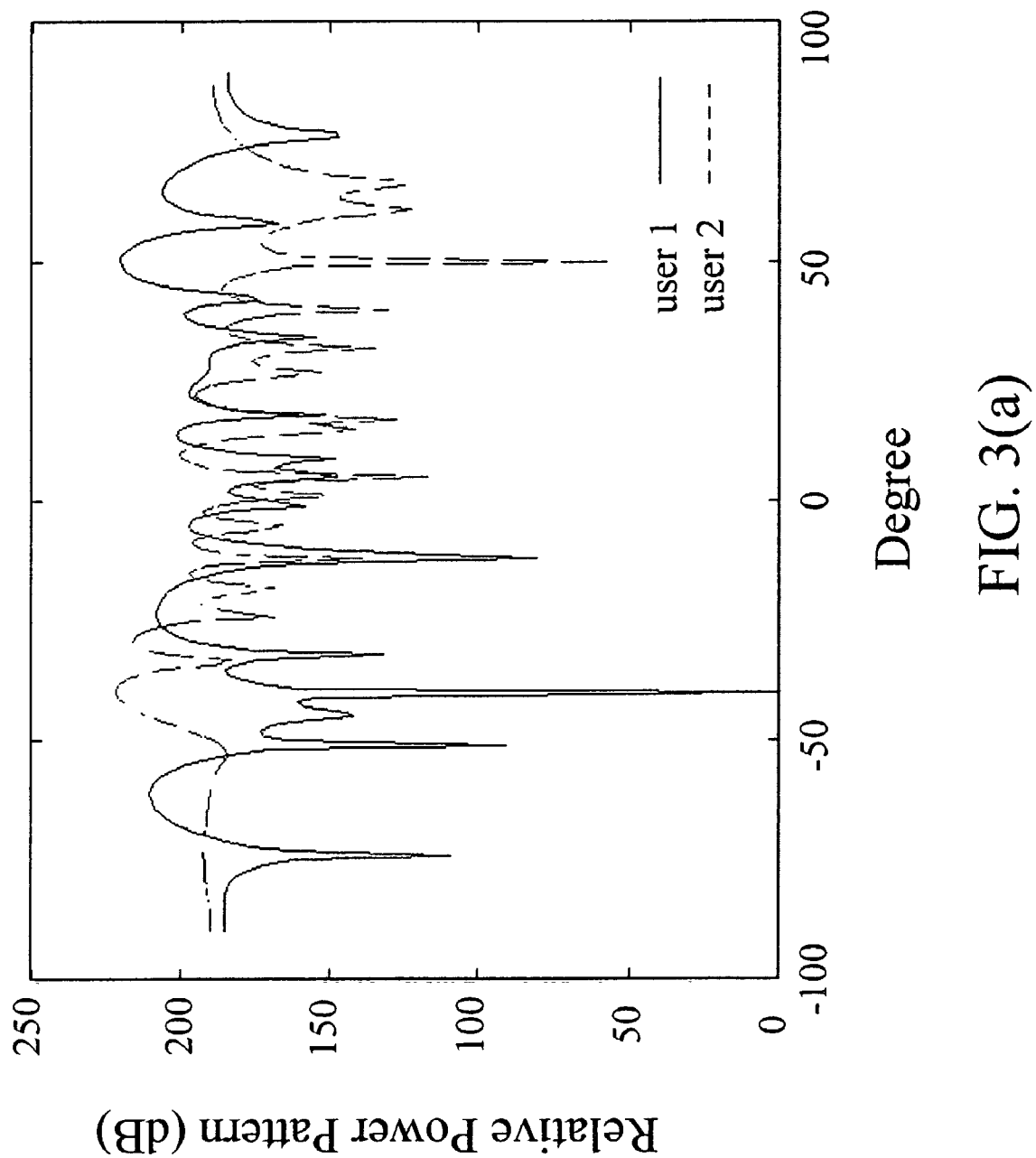
FIG. 3(a) and FIG. 3(b) illustrate an uplink optimized radiation patterns by phase-only perturbation in accordance with the present invention.
Figure 3B:
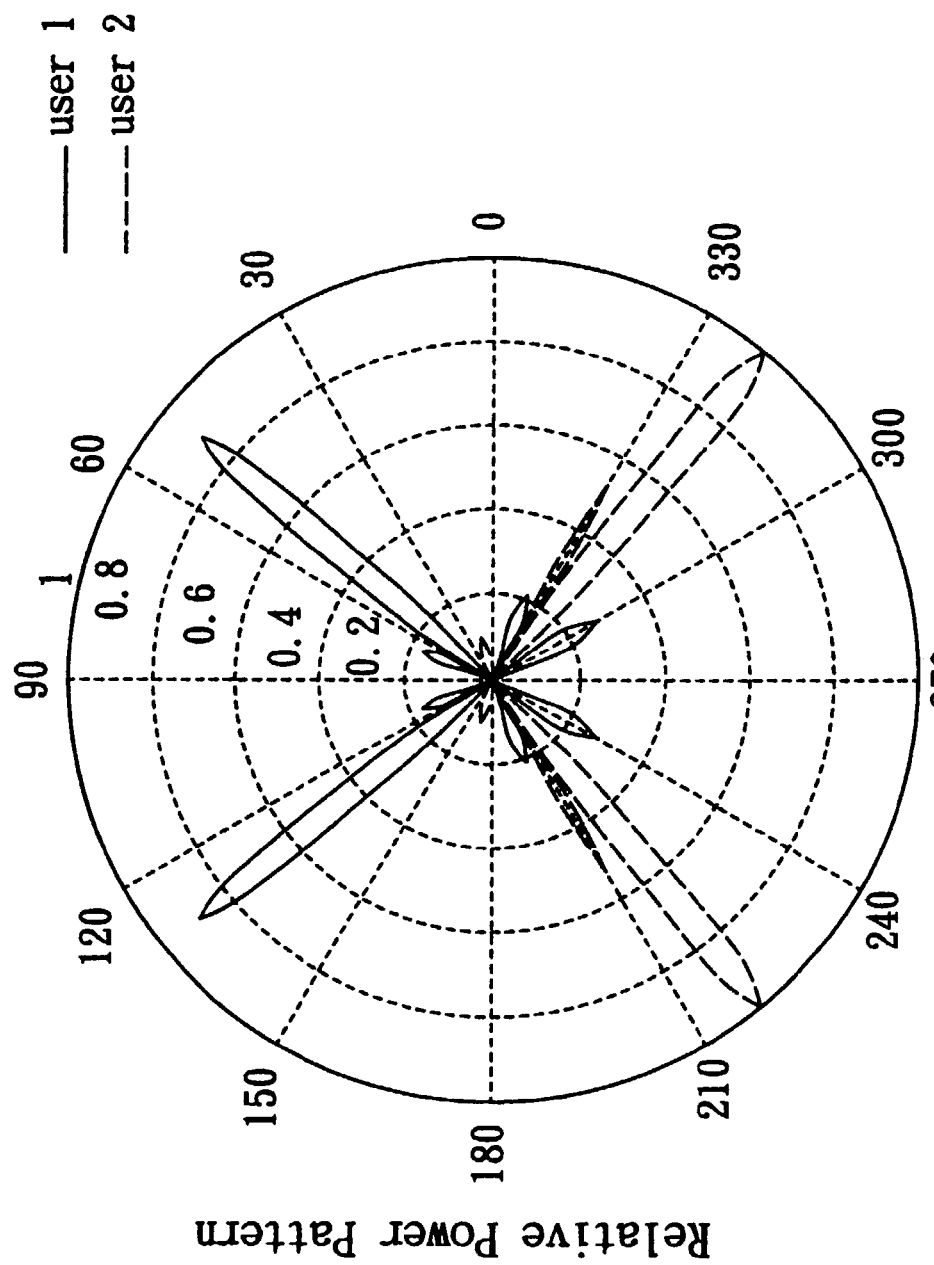

An optimizing uplink radiation pattern and achieving SDMA using genetic algorithms by phase-only perturbations, i.e. the amplitude weights $\alpha_{mn}$ are constant, $\alpha_{mn}=\alpha$, of above embodiment are shown in FIG. 3(a) and FIG. 3(b). The SIRs of user 1 and user 2, shown in FIG. 3(a), are 225 dB and 165 dB respectively. The radiation pattern of smart antenna in 360° is shown in FIG. 3(b).

Figure 4A:
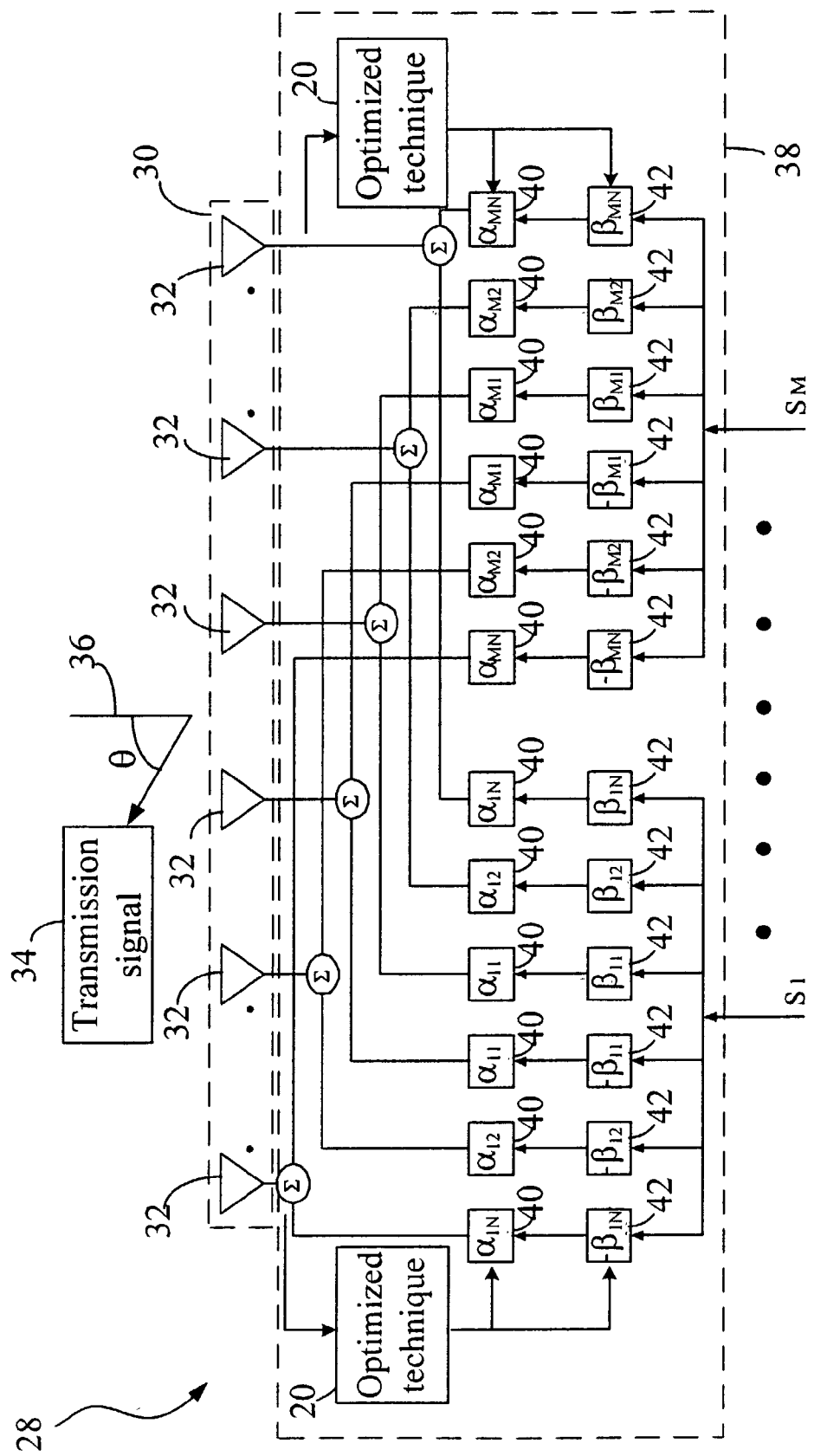
FIG. 4(a) illustrates a downlink diagram of smart antenna in accordance with the present invention.
Figure 4B:
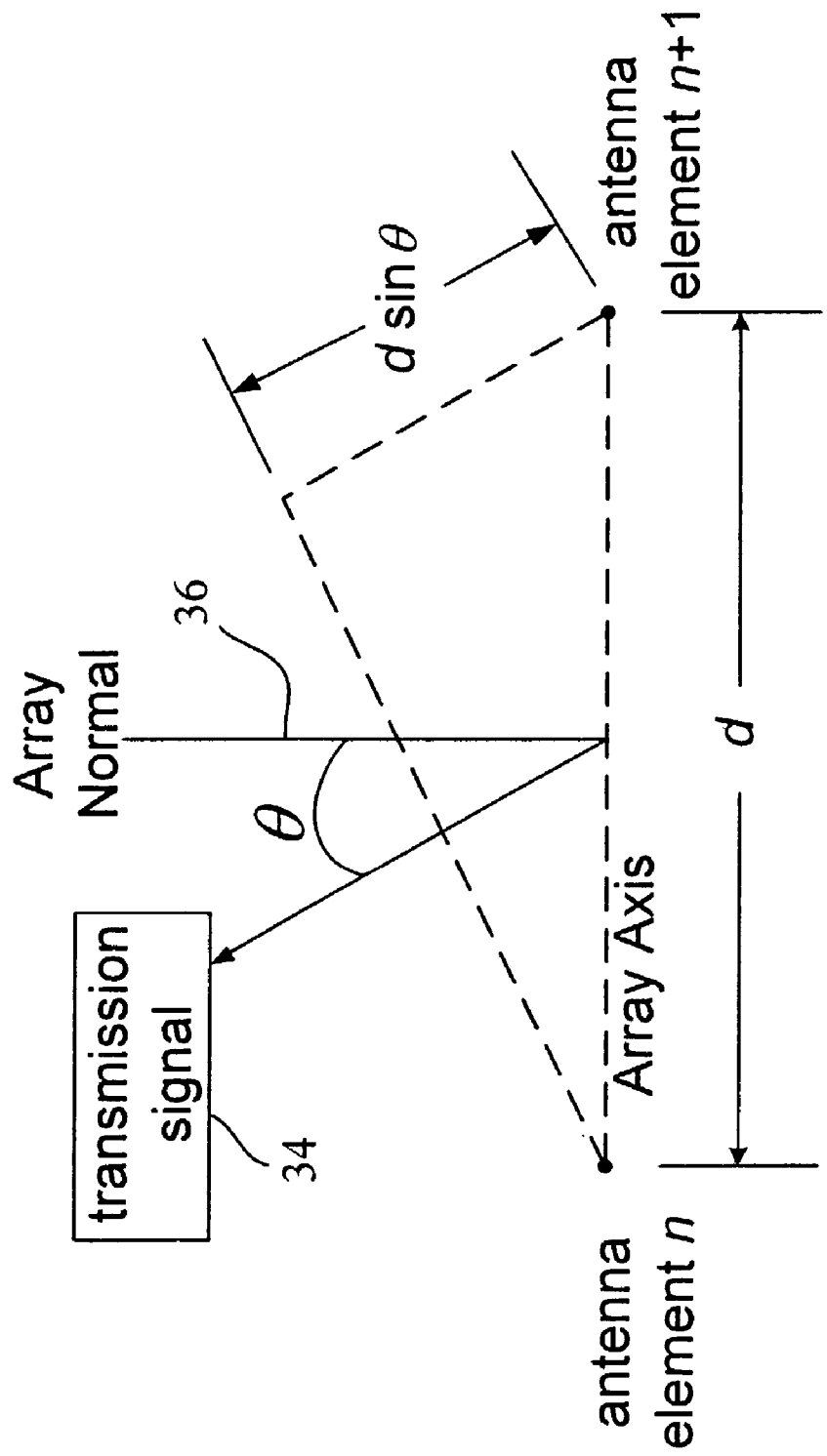
FIG. 4(b) illustrates a transmitted mechanism of smart antenna in accordance with the present invention.

FIG. 4(a) illustrates a downlink diagram of smart antenna 28 for transmitter in accordance with the present invention. A smart antenna 28 includes a linear array antenna 30 of 2N antenna elements 32. The angle between a transmission signal 34 and the array normal 36 is θ. The transmission signal 34 could be from a desired source or an interfering source also. In case of M users in a same channel of the smart antenna 28, the distance d of the nth and (n+1)th adjacent antenna elements 32, shown in FIG. 4(b), is half of the signal wavelength λ. Signals $S_1$ to $S_M$ from user 1 to user M respectively are optimized by a radiation cluster network 38. The radiation cluster network 38 employs an optimized technique 20 in iterating amplitude weights 40 and phase shift weights 42 to obtain optimal amplitude and phase shift weights and derive an optimal radiation pattern of the smart antenna 28 for transmitter, i.e., the SIR of the desired signal is maximized.

For a linear array 30 of equispaced antenna elements 32 as shown in FIG. 4(a), a transmission signal 34 of wavelength λ in direction θ with respect to the array normal 36 is transmitted from any two adjacent antenna elements n and n+1 by a distance d as shown in FIG. 4(b). As the radio waves of the transmission signal 34 leave antenna element n and antenna element n+1 at the same time, there is a time difference τ between the points of time at which they reach the user.

$$\tau = \frac{d\sin\theta}{v} \tag{7}$$

If reference point is set at the physical center of the linear array 30, because of the phase-amplitude perturbation method, amplitude weights are in even symmetry, and phase shift weights are in odd symmetry. Therefore, the array factor can be expressed as:

$$AF_m(\theta) = 2 * \frac{1}{M} \sum_{n=1}^{N} \alpha_{mn} \cos[(n-0.5)\psi + \beta_{mn}], \quad (8)$$
$$m = 1, 2, 3, \ldots, M$$

The physical meanings of all the other parameters, except time difference $\tau$ and transmission angle $\theta$, used in these two equations are the same as those used in the uplink case mentioned above. The formula deduction process is also the same.

If the smart antenna 28 used for 2 users contains 20, antenna elements 32, the signal of user 1 is transmitted to the direction of −60° (i.e.

Figure 5A:
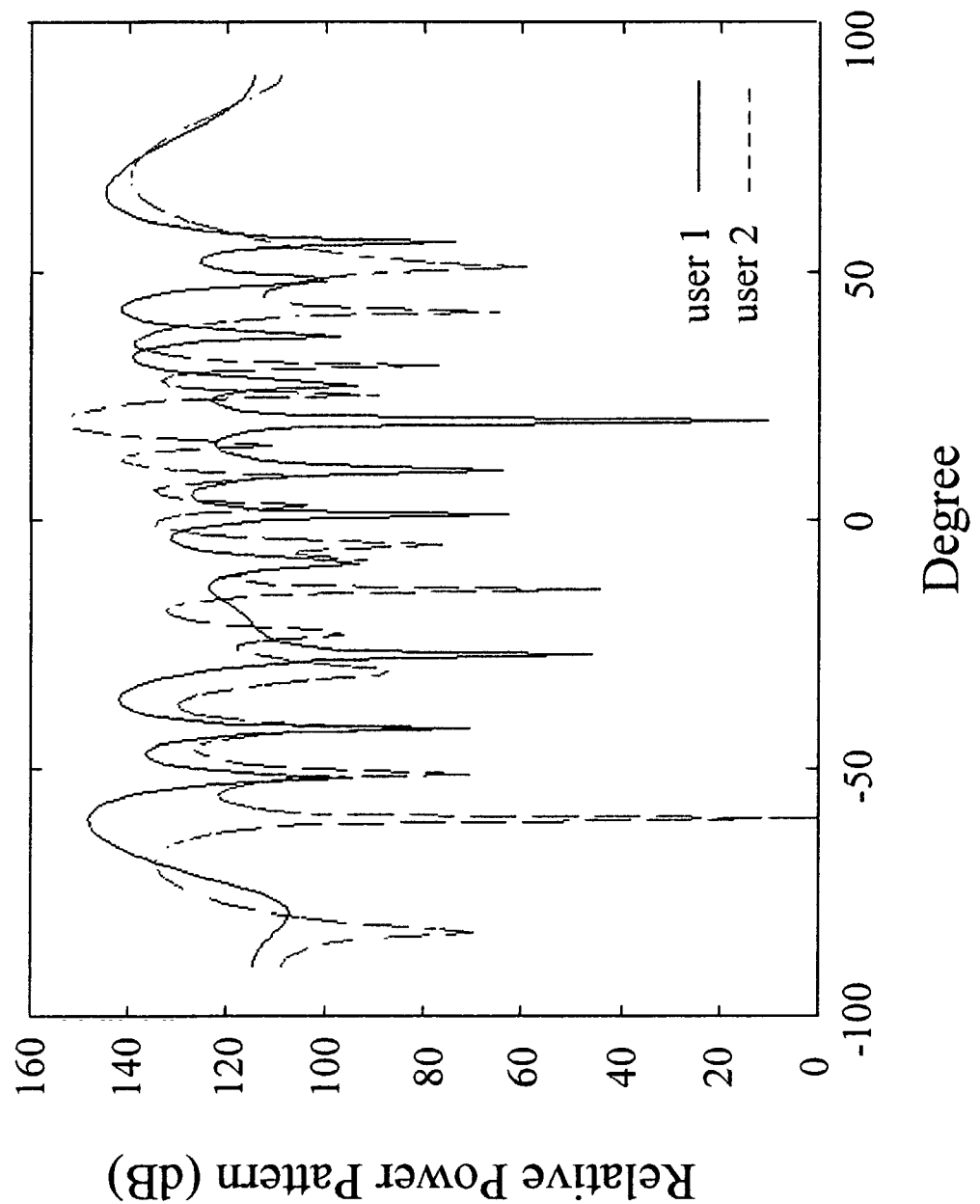
FIG. 5(a) and FIG. 5(b) illustrate a downlink optimized radiation patterns by phase-amplitude perturbation in accordance with the present invention.
Figure 5B:
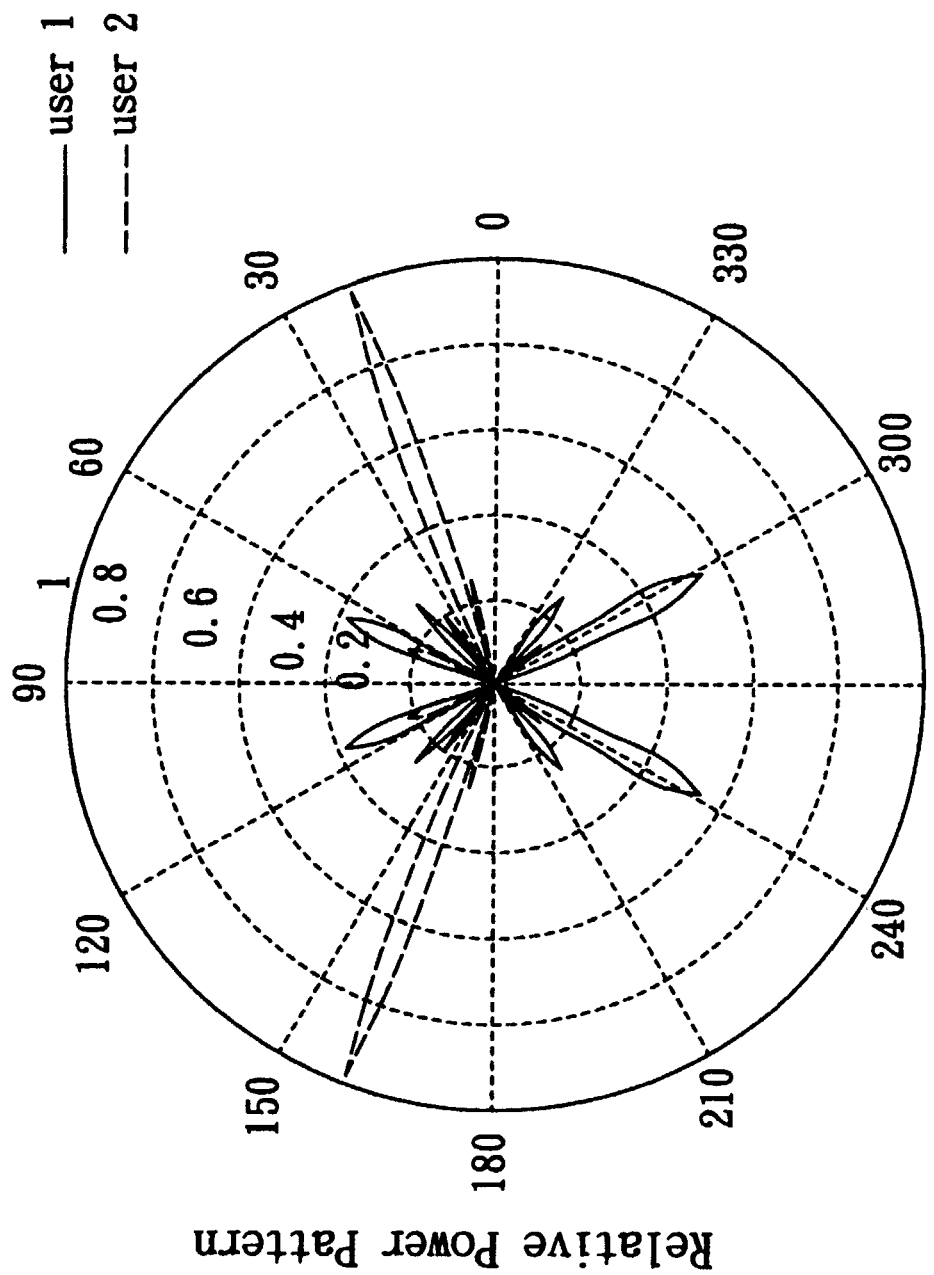

300°), and the signal of user 2 is transmitted to the direction of 20°. The optimizing downlink radiation patterns and achieving SDMA using genetic algorithms by phase-amplitude perturbations are shown in FIG. 5(a) and FIG. 5(b). The SIRs of user 1 and user 2, shown in FIG. 5(a), are 198 dB and 165 dB respectively. The radiation pattern in 360° of smart antenna is shown in FIG. 5(b).

Figure 6A:
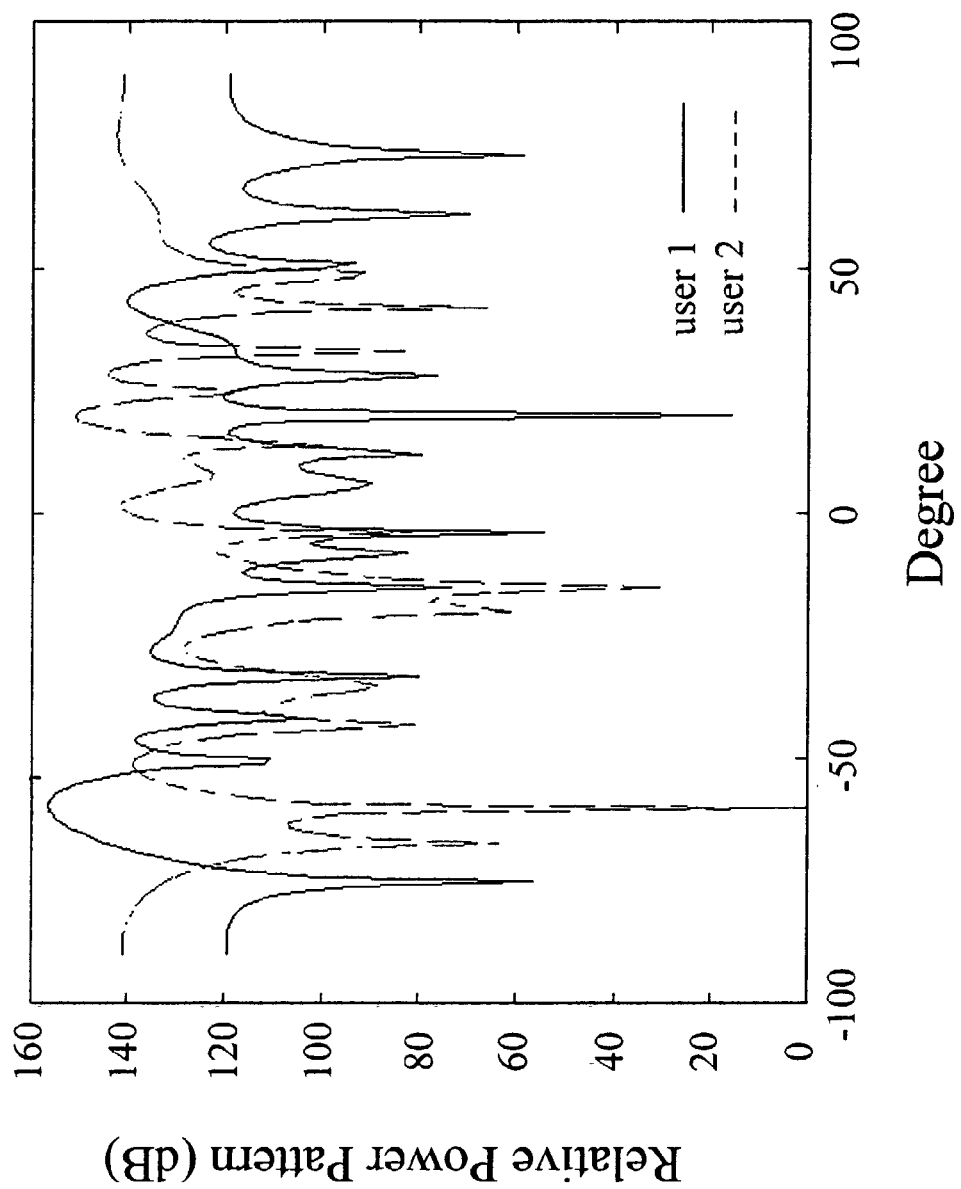
FIG. 6(a) and FIG. 6(b) illustrate a downlink optimized radiation patterns by phase-only perturbation in accordance with the present invention.
Figure 6B:
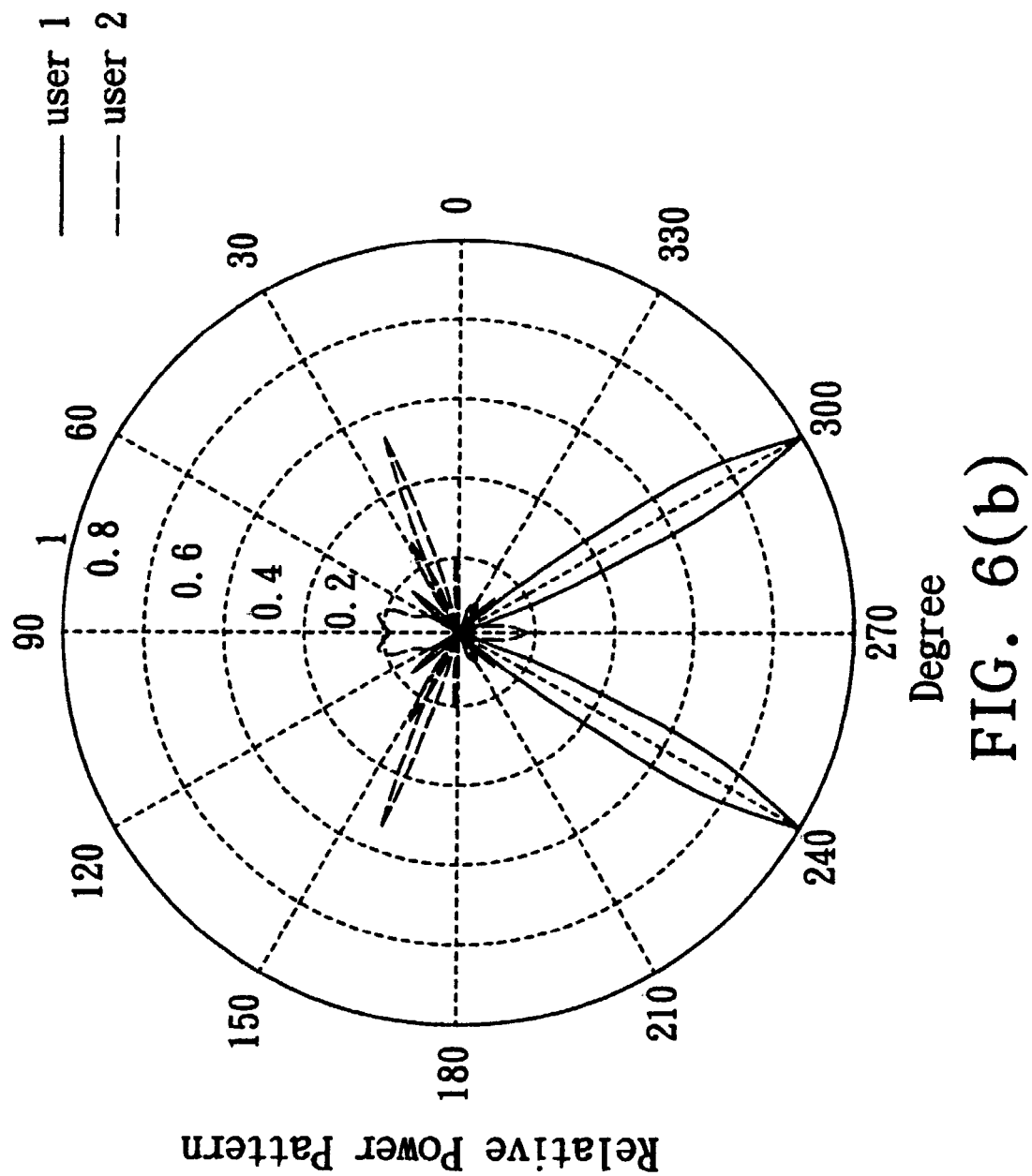

In case of phase-only perturbations of the above downlink radiation embodiment, the optimizing downlink radiation patterns are shown in FIG. 6(a) and FIG. 6(b). The SIRs of user 1 and user 2, shown in FIG. 6(a), are 155 dB and 130 dB respectively. The radiation pattern in 360° of smart antenna is shown in FIG. 6(b).

The above-described embodiments of the present invention are intended to be illustrative only. Numerous alternative embodiments may be devised by those skilled in the art without departing from the scope of the following claims.

What is claimed is:

1. A method for optimizing a radiation pattern of a smart antenna including a linear array of antenna elements, comprising the steps of:
    determining directions of a desired signal and interfering signals;
    adjusting amplitude weights and phase shift weights of the antenna elements by a cost function until the cost function in the direction of the desired signal is maximized and the cost function in the direction of each interfering signal is minimized; and
    obtaining the optimized radiation pattern by the cost function with the adjusted amplitude weights and phase shift weights;
    wherein the cost function is represented by $AF_m(\theta)$:

$$AF_m(\theta) = 2 * \frac{1}{M} \sum_{n=1}^{N} \alpha_{mn} \cos[(n-0.5)\psi + \beta_{mn}], m = 1, 2, 3, \ldots, M$$

where M is the number of users;
    $AF_m(\theta)$ is the cost function of the linear array for a receiver m;
    2N is the number of antenna elements;
    n=1,2,3, . . . , N;
    $\alpha_{mn}$ is the amplitude weight of antenna element n for the receiver m;
    $\beta_{mn}$ is the phase shift weight of antenna element n for the receiver m;

$\theta$ is an angle between an incident signal and an array normal; and
    $\Psi = kd \sin \theta$, k is a Boltzmann constant, d is a distance of two adjacent antenna elements.

2. The method for optimizing radiation pattern of a smart antenna of claim 1, wherein the adjusted amplitude weights and the phase shift weights for the optimal radiation pattern are derived using an iterative solution of advanced algorithms.

3. The method for optimizing radiation pattern of a smart antenna of claim 1, wherein the desired signal and the interfering signals impinge on the antenna elements in uplink.

4. The method for optimizing radiation pattern of a smart antenna of claim 1, wherein the desired signal and the interfering signals are transmitted from the antenna elements in downlink.

5. The method for optimizing radiation pattern of a smart antenna of claim 1, wherein the number of users in uplink is the same as that in downlink.

6. The method for optimizing radiation pattern of a smart antenna of claim 1, which is an implementation of SDMA.

7. The method for optimizing radiation pattern of a smart antenna of claim 1, wherein a chromosome and its fitness for the interfering signals are saved in a vector C and a variable F, the chromosome and its fitness are selected out from the nth iteration step are $C_n$ and $F_n$, the chromosome and its fitness selected out from the (n+1)th iteration step are $C_{n+1}$ and $F_{n+1}$, $F^1$ denotes the first interfering signal and $F^2$ denotes the second interfering signal, which uses the following reference convergence method for iterating the amplitude weights and the phase shift weights:
    if both $F_{n+1}^1$ and $F_{n+1}^2$ are larger than F, the value of C and F are unchanged;
    if both $F_{n+1}^1$ and $F_{n+1}^2$ are smaller than F, $F_{n+1}^1$ is smaller than $F_n^1$ and $F_{n+1}^2$ is smaller than $F_n^2$, F is replaced with the larger one of $F_{n+1}^1$ and $F_{n+1}^2$, and the value of C is changed to the corresponding $C_{n+1}$; and
    if both $F_{n+1}^1$ and $F_{n+1}^2$ are smaller than F, and one of "$F_{n+1}^1$ is smaller than $F_n^1$ but $F_{n+1}^2$ is larger than $F_n^2$" and "$F_{n+1}^2$ is smaller than $F_n^2$ but $F_{n+1}^1$ is larger than $F_n^1$" is existed, F is replaced with the larger one of $F_{n+1}^1$ and $F_{n+1}^2$, and the value of C is changed to the corresponding $C_{n+1}$.

8. A method for optimizing a radiation pattern of a smart antenna including a linear array of antenna elements, comprising the steps of:
    determining directions of a desired signal and interfering signals;
    adjusting phase shift weights of the antenna elements by a cost function until the cost function in the direction of the desired signal is maximized and the cost function in the direction of each interfering signal is minimized; and
    obtaining the optimized radiation pattern by the cost function with adjusted phase shift weights;
    wherein the cost function is represented by $AF_m(\theta)$:

$$AF_m(\theta) = 2 * \frac{1}{M} \sum_{n=1}^{N} \alpha \cos[(n-0.5)\psi + \beta_{mn}], m = 1, 2, 3, \ldots, M$$

where M is the number of users;
    $AF_m(\theta)$ is the cost function of the linear array for a receiver m;

2N is the number of antenna elements;

n=1,2,3, ..., N;

α is the amplitude weight of antenna element;

$\beta_{mn}$ is the phase shift weight of antenna element n for the receiver m;

θ is an angle between an incident signal and an array normal; and

Ψ=kd sin θ, k is a Boltzmann constant, d is a distance of two adjacent antenna elements.

9. The method for optimizing radiation pattern of a smart antenna of claim 8, wherein the adjusted phase shift weights for optimal pattern is derived using an iterative solution of advanced algorithms.

10. The method for optimizing radiation pattern of a smart antenna of claim 8, wherein the desired signal and interfering signals impinge on the antenna elements in uplink.

11. The method for optimizing radiation pattern of a smart antenna of claim 8, wherein the desired signal and interfering signals are transmitted from the antenna elements in downlink.

12. The method for optimizing radiation pattern of a smart antenna of claim 8, wherein the number of users in uplink is the same as that in downlink.

13. The method for optimizing radiation pattern of a smart antenna of claim 8, which is an implementation of SDMA.

14. The method for optimizing radiation pattern of a smart antenna of claim 8, wherein a chromosome and its fitness for the interfering signals are saved in a vector C and a variable F, the chromosome and its fitness are selected out from the nth iteration step are $C_n$ and $F_n$, the chromosome and its fitness selected out from the (n+1)th iteration step are $C_{n+1}$ and $F_{n+1}$, $F^1$ denotes the first interfering signal and $F^2$ denotes the second interfering signal, which uses the following reference convergence method for iterating the phase shift weights:

if both $F_{n+1}^1$ and $F_{n+1}^2$ are larger than F, the value of C and F are unchanged;

if both $F_{n+1}^1$ and $F_{n+1}^2$ are smaller than F, $F_{n+1}^1$ is smaller than $F_n^1$ and $F_{n+1}^2$ is smaller than $F_n^2$, F is replaced with the larger one of $F_{n+1}^1$ and $F_{n+1}^2$, and the value of C is changed to the corresponding $C_{n+1}$; and if both $F_{n+1}^1$ and $F_{n+1}^2$ are smaller than F, and one of "$F_{n+1}^1$ is smaller than $F_n^1$ but $F_{n+1}^2$ is larger than $F_n^2$" and "$F_{n+1}^2$ is smaller than $F_n^2$ but $F_{n+1}^1$ is larger than $F_n^1$" is existed, F is replaced with the larger one of $F_{n+1}^1$ and $F_{n+1}^2$, and the value of C is changed to the corresponding $C_{n+1}$.

* * * * *